US007327305B2

(12) United States Patent
Loehner et al.

(10) Patent No.: US 7,327,305 B2
(45) Date of Patent: Feb. 5, 2008

(54) PROCESS FOR THE EVALUATION OF SIGNALS IN AN SAR/MTI PULSED RADAR SYSTEM

(75) Inventors: Andreas Loehner, Neu-Ulm (DE); Roland Drescher, Voehringen (DE)

(73) Assignee: EADS Deutschland GmbH, Ottobrunn (DE)

( * ) Notice: Subject to any disclaimer, the term of this patent is extended or adjusted under 35 U.S.C. 154(b) by 145 days.

(21) Appl. No.: 10/562,061

(22) PCT Filed: Jun. 17, 2004

(86) PCT No.: PCT/DE2004/001260

§ 371 (c)(1),
(2), (4) Date: Dec. 22, 2005

(87) PCT Pub. No.: WO2005/001507

PCT Pub. Date: Jan. 6, 2005

(65) Prior Publication Data

US 2007/0096976 A1   May 3, 2007

(30) Foreign Application Priority Data

Jun. 23, 2003   (DE) ............................... 103 28 279

(51) Int. Cl.
  *G01S 13/524*  (2006.01)
  *G01S 13/534*  (2006.01)
  *G01S 13/90*   (2006.01)

(52) U.S. Cl. ................. 342/25 B; 342/25 E; 342/137; 342/160; 342/161; 342/162

(58) Field of Classification Search .............. 342/25 R, 342/25 A, 25 B, 25 C, 25 D, 25 E, 25 F, 342/137, 159–162
See application file for complete search history.

(56) References Cited

U.S. PATENT DOCUMENTS

| 3,903,525 A | * | 9/1975 | Mullins et al. | ............. 342/161 |
| 3,972,041 A | * | 7/1976 | Howard | ....................... 342/89 |
| 4,549,184 A | * | 10/1985 | Boles et al. | .............. 342/25 B |
| 5,808,580 A | | 9/1998 | Andrews, Jr. | |

(Continued)

FOREIGN PATENT DOCUMENTS

| DE | 19705795 A1 * | 8/1998 |
| EP | 0 251 498 A | 1/1988 |
| JP | 10 078481 A | 6/1998 |

OTHER PUBLICATIONS

"Reconnaissance with ultra wideband UHF synthetic aperture radar", Soumekh, M.Signal Processing Magazine, IEEE vol. 12, Issue 4, Jul. 1995 P(s):21-40.*

(Continued)

*Primary Examiner*—John B Sotomayor
(74) *Attorney, Agent, or Firm*—Crowell & Moring LLP

(57) ABSTRACT

The invention relates to a process for the evaluating a received signal of an SAR/MTI pulsed radar system that transmits SAR and MTI pulses with respective definable pulse repetition frequency PRF_SAR and PRF_MTI, such that the received signal is a superimposition consisting of echo pulse sequences of SAR and MTI echo pulse signals. According to the invention, in the received echo pulse sequence of the received signal, each SAR echo from an area of interest is evaluated SAR process. The remaining pulses of the received echo pulse sequence of the received signal are evaluated in using an MTI process.

12 Claims, 3 Drawing Sheets

U.S. PATENT DOCUMENTS 6,255,985 B1 * 7/2001 Towner et al. ............... 342/165
2007/0096976 A1 * 5/2007 Loehner et al. ............. 342/160

OTHER PUBLICATIONS

"Moving target indication with dual frequency millimeter wave SAR", Ruegg, M.; Hagelen, M.; Meier, E.; Nuesch, D. Radar, 2006 IEEE Conference on Apr. 24-27, 2006 P (s): 8 pp.*

P. Hoogeboom et al: "Sostar, A European System for Airboarne Ground Surveillance" 'On Line! Jan. 28, 2002, pp. 1-4, XP 002303903.

Salzman J et al: "Interrupted synthetic aperture radar (SAR)", Proceedings of the 2001 IEEE Radar Conference. Atlanta, GA May 1-3, 2001.

* cited by examiner

PROCESS FOR THE EVALUATION OF SIGNALS IN AN SAR/MTI PULSED RADAR SYSTEM

BACKGROUND AND SUMMARY OF THE INVENTION

This application claims the priority of German patent document 103 28 279.3, filed Jun. 23, 2003 (PCT International Application No. PCT/DE2004/001260, filed Jun. 17, 2004), the disclosure of which is expressly incorporated by reference herein.

The invention relates to a process for the evaluation of the received signals in a SAR/MTI pulsed radar system.

Synthetic Aperture Radar/Moving Target Indication (SAR/MTI) pulsed radar systems, can be used both to acquire SAR images and to identify moving targets in the acquired images. FIG. 1 shows the pulse sequence of a transmitted signal of a SAR/MTI pulsed radar system. Because of the different illumination times that are required to achieve a high resolution with the respective evaluation methods, the pulse repetition frequencies of the transmitted SAR and MTI pulses differ considerably. For a typical SAR evaluation, an illumination time T SAR of more than ten seconds is possible. However, the illumination time T MTI of a ground area for identifying and tracking moving targets normally amounts to 100 ms.

FIG. 2 shows a received echo pulse sequence which essentially is a superimposition of SAR and MTI echo pulses. In known SAR/MTI radar systems, the signal evaluation takes place such that the acquisition and generation of SAR images and the analysis of the SAR images by means of MTI processes for identifying moving targets, take place in time sequence. Normally, a SAR image is acquired first, and is subsequently examined in an MTI process with respect to moving targets.

Simultaneous analysis of the signals in a SAR and an MTI process can therefore be carried out only at great technical expense. For known processes for evaluating signals in SAR/MTI radar systems, the received signal is divided into two approximately identical components, and one part of the signal is fed to a device for SAR signal evaluation, while the other is fed to a device for MTI signal evaluation. In this case, however, it is disadvantageous that the radar system, particularly the radar antenna, comprises a large number of constructional elements, and requires high technical expenditures. This results in additional disadvantages with respect to the considerable weight of the antenna. Another disadvantage is the large dimension of the antenna, which makes it difficult to integrate it in a flying device.

It is therefore an object of the invention to provide a process which allows simultaneous evaluation of the received signals with respect to the SAR and the MTI, without high technical expenditures.

Another object of the invention is to provide an antenna for implementing the process.

These and other objects and advantages are achieved by the method and apparatus according to the invention, in which, in the received echo pulse sequence of the received signal, each pulse that corresponds to an integral multiple of an integral ratio of the pulse repetition frequency PRF MTI of the transmitted MTI signal to the pulse repetition frequency PRF SAR of the transmitted SAR signal, and which is received after a transmitted SAR pulse, is evaluated in a SAR process. According to the invention, the remaining pulses of the received echo pulse sequence are evaluated in an MTI process, and the pulse for the MTI signal processing which is absent as a result of the SAR signal processing, is reproduced by means of an interpolation method.

Other objects, advantages and novel features of the present invention will become apparent from the following detailed description of the invention when considered in conjunction with the accompanying drawings.

DETAILED DESCRIPTION OF THE DRAWINGS

Figure 1:
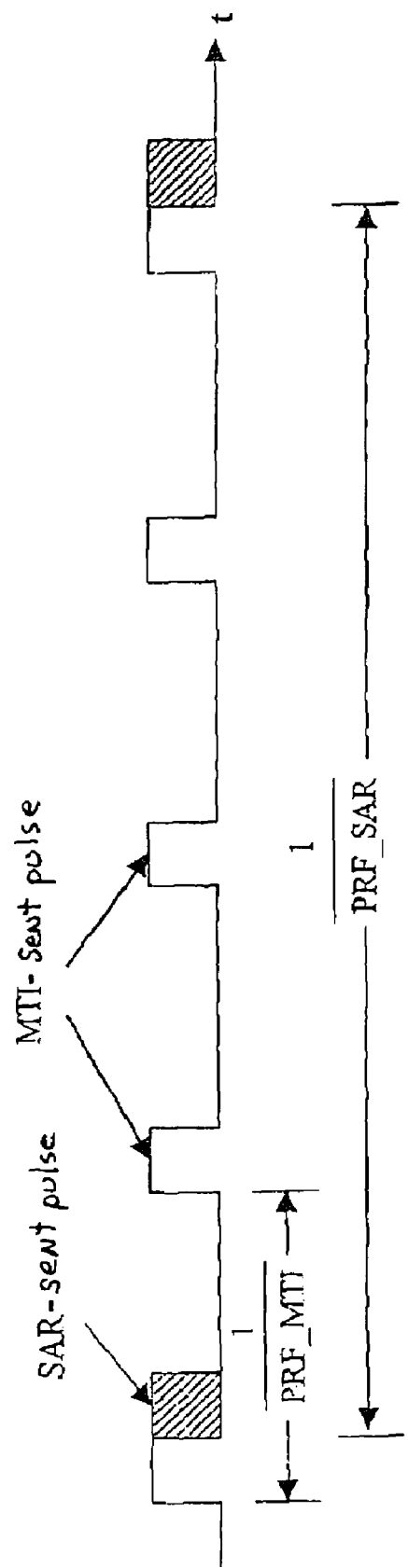
FIG. 1 illustrates an example of a transmitted pulse sequence of an SAR/MTI radar system with transmitted SAR and MTI pulses.

As shown in FIG. 1, because of the lower pulse repetition frequency of the transmitted SAR pulse relative to a transmitted MTI pulse, the emission of a SAR pulse takes place only after each fifth MTI pulse. (That is, the ratio of the pulse repetition frequency PRF MTI of the transmitted MTI signal to the pulse repetition frequency PRF SAR of the transmitted SAR signal is five.) In the time window between the transmitted pulses, the radar system is switched to reception.

Figure 2:
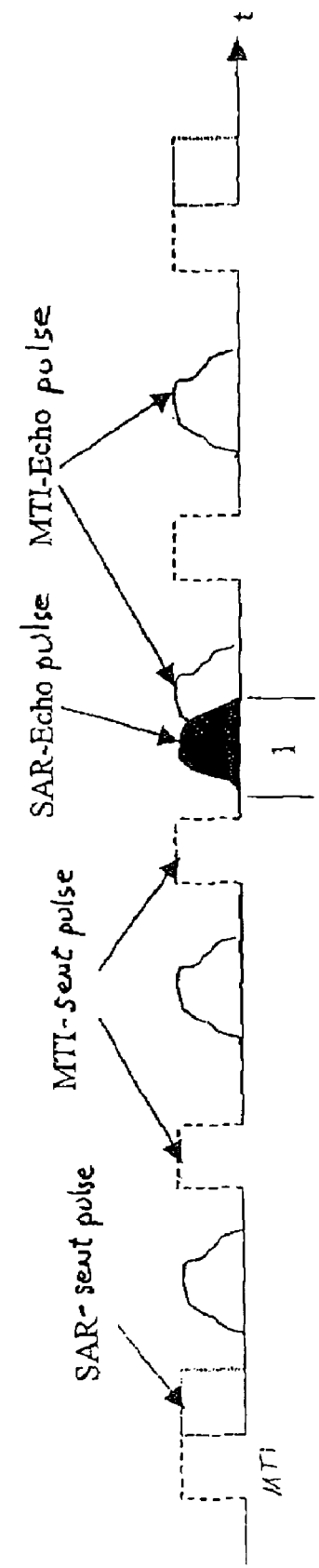
FIG. 2 shows an example of an echo pulse sequence of an SAR/MTI radar system, with transmitted SAR and MTI pulses.

An example of the echo pulse sequence resulting from a transmitted signal is illustrated in FIG. 2, which shows a superimposition of SAR and MTI echo pulses. The pulse received in the time interval marked by reference number 1 in FIG. 2 is evaluated by means of a known SAR process. According to the invention, the MTI pulse that is lost in this manner is reproduced by an interpolation process, in a manner that will be readily understood by those skilled in the art. One such interpolation process is described, for example, in Joseph Salzmann et al., "Interrupted Synthetic Aperture Radar (SAR)"; *IEEE AESS Systems Magazine*, May 2002, Pages 33-39, the disclosure of which is incorporated by reference herein. (Other known processes may be used, however.) Advantageously, the ratio of the pulse repetition frequency PRF MTI of the transmitted MTI signal to the pulse repetition frequency PRF SAR of the transmitted SAR signal can be changed from one MTI burst to the next MTI burst, and distance ambiguities occurring during the MTI signal evaluation can be determined in this manner.

The pulse repetition frequency PRF SAR of the transmitted signal advantageously amounts to between 200 Hz and 400 Hz, and the pulse repetition frequency PRF MTI advantageously amounts to between 2 kHz and 4 kHz. Thus, integral ratios of the pulse repetition frequency PRF MTI of the transmitted MTI signal to the pulse repetition frequency PRF SAR of the transmitted SAR signal of five, six, seven, eight, nine, ten, eleven, twelve, thirteen, fourteen, fifteen, sixteen, seventeen, eighteen, nineteen and twenty are possible. Naturally, it is also possible to set larger ratios by a suitable adaptation of the pulse repetition frequencies PRF SAR and PRF MTI.

Figure 3:
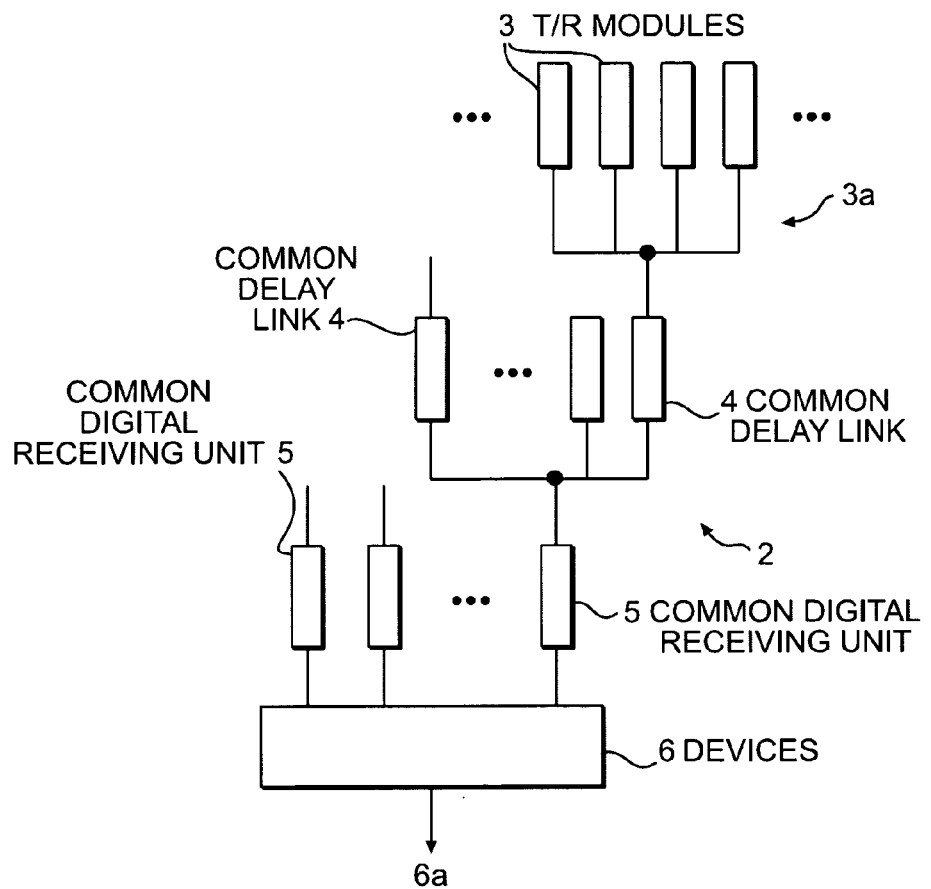
FIG. 3 is a schematic block diagram of an antenna arrangement according to the invention.

FIG. 3 is a schematic block diagram of a first special embodiment of an antenna arrangement 2 according to the invention, which comprises a plurality of transmitting and receiving modules 3 (T/R modules). The latter are combined to form a definable number of subgroups 3a. The T/R modules 3 are of each subgroup 3a are applied to a common delay link 4, and a definable number of the latter are advantageously combined and applied to a common digital receiving unit 5.

The digital receiving units 5 are advantageously connected with devices 6 for digital beam shaping and for moving target indication according to the known space time adaptive processing (STAP) method. The devices 6 for the digital beam shaping and for the moving target indication are advantageously applied to additional devices 6a for SAR and MTI signal evaluation.

Figure 4:
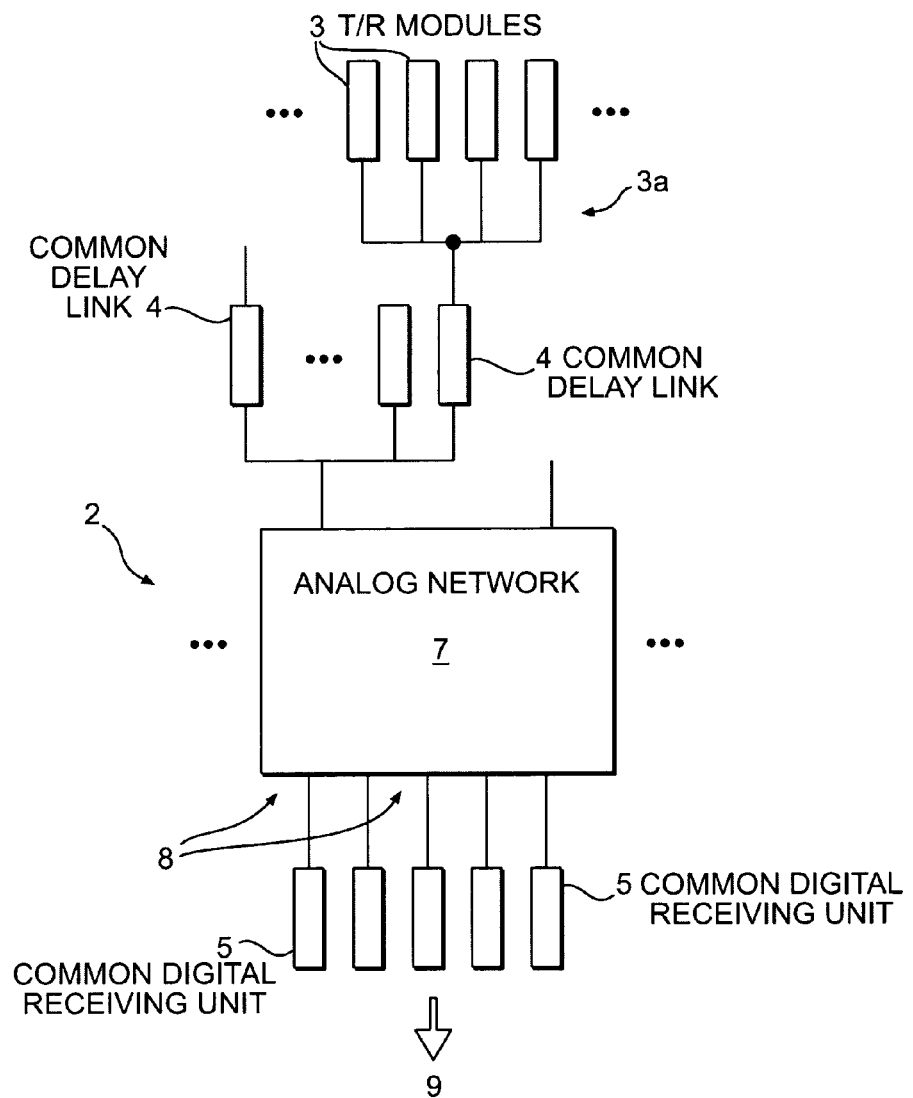
FIG. 4 is a schematic block diagram of another embodiment of an antenna arrangement according to the invention.

FIG. 4 is a schematic view of a second embodiment of an antenna 2 according to the invention, which comprises a plurality of T/R modules 3 that are combined to form a definable number of subgroups 3a. In this embodiment, a definable number of delay links 4 are combined and applied to an analog network 7 with a definable number of outputs 8 that are each applied to a digital receiving unit 5 (particularly, an analog-to-digital converter). The digital receiving units 5 each are applied to devices 9 for SAR and MTI signal evaluation. In this case, the analog network 7 simultaneously generates different narrow-band radiation patterns in different directions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of selecting SAR an MTI transmission patterns and evaluating a received signal of a SAR/MTI pulsed radar system that transmits SAR and MTI pulses with respective definable time variant pulse repetition frequencies PRF_SAR and PRF_MTI, such that the received signal comprises a superimposition of SAR and MTI echo signals, said method comprising:
   generating a SAR and MTI pulse pattern with equal or different SAR and MTI pulse repetition frequencies;
   using a SAR processing technique to evaluate each SAR echo of an area of interest, which echo is received after a transmitted SAR pulse; and
   evaluating remaining pulses of the received echoes in an MTI process, taking into account that some received MTI echoes are missing.

2. The method according to claim 1, wherein the ratio of the pulse repetition frequency PRF_MTI to the pulse repetition frequency PRF_SAR amounts to at least 5.

3. The method according to claim 1, wherein the ratio of the pulse repetition frequency PRF_MTI to the pulse repetition frequency PRF_SAR is varied from one MTI burst to a next MTI burst.

4. The method according to claim 1, wherein the pulse repetition frequency PRF_SAR is between 200 Hz and 400 Hz.

5. The method according to claim 1, wherein the pulse repetition frequency PRF_MTI is between 2 kHz and 4 kHz.

6. Apparatus for implementing the process according to claim 1, said apparatus comprising an antenna having a plurality of transmitting and receiving modules, wherein the transmitting and receiving modules are combined to form a definable number of subgroups.

7. The apparatus according to claim 6, wherein a definable number of transmitting and receiving modules are applied to a common delay link.

8. The apparatus according to claim 7, wherein a definable number of delay links are combined and applied to a digital receiving unit comprising an analog-to-digital converter.

9. The apparatus according to claim 8, wherein the digital receiving units are connected with devices for digital beam shaping, and for moving target indication according to the STAP process.

10. The apparatus according to claim 6, wherein the devices for digital beam shaping and moving target indication are connected with additional devices for the SAR and MTI signal evaluation.

11. The apparatus according to claim 7, wherein:
   a definable number of delay links are combined into an analog network with a definable number of outputs that are each applied to a digital receiving unit in the form of an analog-to-digital converter; and
   the digital receiving units each applied by means of devices for the SAM and MTI signal evaluation.

12. The method according to claim 1, wherein, the step of evaluating remaining MTI echoes includes reproducing by interpolation the MTI echo that is absent as a result of the SAR signal processing.

* * * * *